(12) United States Patent
Groe

(10) Patent No.: US 7,970,367 B1
(45) Date of Patent: Jun. 28, 2011

(54) SYSTEM FOR DUAL DIVERSITY RECEIVER USING SWITCHED LNAS

(75) Inventor: John Groe, Poway, CA (US)

(73) Assignee: Quintic Holdings, Santa Clara, CA (US)

( * ) Notice: Subject to any disclaimer, the term of this patent is extended or adjusted under 35 U.S.C. 154(b) by 515 days.

(21) Appl. No.: 12/147,324

(22) Filed: Jun. 26, 2008

Related U.S. Application Data

(63) Continuation of application No. 12/036,092, filed on Feb. 22, 2008, now abandoned, which is a continuation of application No. 10/724,013, filed on Nov. 26, 2003, now abandoned.

(51) Int. Cl.
*H04B 17/02* (2006.01)
(52) U.S. Cl. ....... 455/133; 455/132; 455/134; 455/41.2; 455/226.2; 375/132; 375/148

(58) Field of Classification Search .......... 455/133, 455/132, 134, 41.2, 226.2; 375/132, 148
See application file for complete search history.

(56) References Cited

U.S. PATENT DOCUMENTS 6,018,651 A * 1/2000 Bruckert et al. ........... 455/277.1
6,871,052 B2 * 3/2005 Spencer et al. ............ 455/226.2
\* cited by examiner

*Primary Examiner* — Sanh D Phu
(74) *Attorney, Agent, or Firm* — Blairtech Solution LLC

(57) ABSTRACT

System for dual diversity receiver using switched LNAs. A dual diversity receiver is provided that includes two antennas to receive a radio signal, where each antenna produces an antenna signal that is representative of the received radio signal. The receiver includes first and second LNAs that receive the respective antenna signals and output first and second amplified signals. The receiver also includes logic to determine the stronger antenna signal and select one of the LNA outputs for processing by the receiver.

13 Claims, 11 Drawing Sheets

SYSTEM FOR DUAL DIVERSITY RECEIVER USING SWITCHED LNAS

CROSS REFERENCE TO RELATED APPLICATIONS

This application is a continuation of U.S. patent application Ser. No. 12/036,092, entitled SYSTEM FOR DUAL DIVERSITY RECEIVER USING SWITCHED LNAs, filed Feb. 22, 2008, which was a continuation of U.S. patent application Ser. No. 10/724,013, entitled SYSTEM FOR DUAL DIVERSITY RECEIVER USING SWITCHED LNAs, filed Nov. 26, 2003, the content of which is incorporated by reference herein in its entirety for all purposes.

FIELD OF THE INVENTION

The present invention relates generally to wireless receivers, and more particularly, to a wireless receiver system employing multiple antennas and a switching system to intelligently switch between two low-noise amplifiers based on the stronger antenna signal and a channel characteristic.

BACKGROUND

The radio interface is unique to wireless communication systems and is responsible for much of the complexity associated with these systems. The radio communication channel is affected by large and small-scale fading phenomena. The large-scale phenomena are due to the attenuation of the transmitted signal as it travels through the atmosphere. The small-scale effects depend on multipath propagation due to reflections, diffraction and scattering, and behave unpredictably, leading to sharp and quick variations of the signal strength over small distances.

Therefore, it would advantageous to have a receiver system that is able to compensate for the effects of large and small-scale fading phenomena.

SUMMARY

In one or more embodiments, a dual diversity receiver system is provided that selects the stronger of two received signals. The receiver system comprises a switched low noise amplifier (LNA) to interface to each of two antennas, and selection logic that performs a switching algorithm to periodically check the received signal power of each antenna to select the stronger signal. In one embodiment, the LNAs are switched to the alternate signal to measure its received signal power when the signal from the active antenna fades below a selected threshold, or when the time since measuring the signal power from the opposite antenna exceeds the time coherence of the channel. One or more embodiments of the receiver system also include adaptive algorithms that perform channel estimation and analyze Doppler shift. A switched-LNA dual diversity receiver system constructed in accordance with the described embodiments greatly improves performance over conventional systems in stationary and slow moving environments.

In one embodiment, a dual diversity receiver is provided that includes two antennas to receive a radio signal, where each antenna produces an antenna signal that is representative of the received radio signal. The receiver comprises first and second LNAs that receive the respective antenna signals and output first and second amplified signals. The receiver also comprises logic to determine the stronger antenna signal and select one of the LNA outputs for processing by the receiver.

In one embodiment, a method is providing for operating a dual diversity receiver that includes two antennas to receive a radio signal, where each antenna produces an antenna signal that is representative of the received radio signal. The method comprises steps of providing first and second LNAs to receive and amplify the respective antenna signals, determining which antenna has the stronger antenna signal, selecting one of the LNA to output a signal for processing by the receiver, and repeating the steps of determining and selecting.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

A dual diversity receiver system uses two antennas to combat small-scale fading effects. Although the two antennas receive the same set of multipath rays, the vector sum of the rays differs at each antenna. If the distance between the two antennas is large enough, the signals received by them undergo independent fading, thereby reducing the probability that both received signals are weak.

Figure 1:
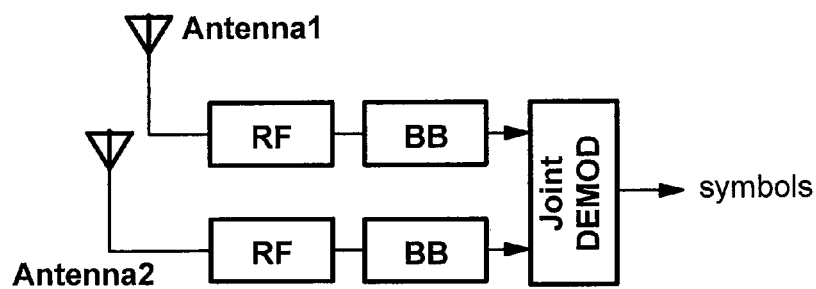
FIG. 1 shows a diagram of one embodiment of a dual diversity receiver system that includes two antennas, which feed two parallel RF receivers.

FIG. 1 shows a diagram of one embodiment of a dual diversity receiver system that includes two antennas, which feed two parallel RF receivers. After baseband conversion, the two antenna signals undergo baseband processing (BB) and joint demodulation (combining or switching, channel decoding and data detection). The dual diversity receiver duplicates the RF and baseband receivers, and thereby doubles the power, cost, and area used. It would therefore be advantageous to combine the signals (or switch between them) as close to the antennas as possible.

Wireless communication systems rely on the radio interface, which by its nature, places fundamental limits on performance. The quality of the radio interface, also known as the radio channel, depends on several factors. This is because the path from the transmitter to the receiver is oftentimes not direct (line of sight). As such, the transmitted signal experiences reflection, diffraction, and scattering. These mechanisms create multiple signals (multipath signals) that travel along different paths of varying lengths, producing different phase offsets.

The multipath signals add vectorially at the receiving antenna. As such, it is possible for the multipath rays to combine destructively and for the received signal to virtually disappear for short periods of time. In a stationary environment, the received signal power follows a spatial function, and as such, the received signal power can vary significantly over very short distances. In an environment where the transmitter, receiver, or other obstructions are moving, spatial fading variations result. These variations translate to time variations that depend on the relative speed of the objects. Furthermore, the relative motion of the objects creates random frequency modulation due to differing Doppler shifts.

The Doppler shift fd can be positive or negative and is equal to:

$$f_d = \frac{v}{\lambda}\cos\theta$$

where v is the relative velocity, λ is the wavelength of the transmitted signal, and θ is the angle associated with the transmitted path. The Doppler shift produces small-scale variations that map directly to the impulse response of the radio channel. Although the resulting impulse response changes, it remains relatively constant for a time period known as the coherence time $(\Delta t)_c$, which is approximately equal to:

$$(\Delta t)_c = \frac{1}{fd} \sim \frac{9\lambda}{16\pi v}$$

where λ/v represents the maximum Doppler shift. This is important because the coherence time also indicates the length of time a received signal experiences fading.

An effective countermeasure against fading is diversity, which can take many forms, such as time, frequency, and space diversity. All have in common the feature of sending two or more copies of the transmitted signal through channels affected by independent fading, and then combining or selecting the received signal replicas. The independent channels reduce the joint probability that the received signal experiences deep fading, thereby enhancing the performance of the communication system.

A channel interleaver/de-interleaver can be used to exploit time diversity by separating the bursts of consecutively faded symbols over different radio frames so as to make them easily correctable by the channel code. In other words, it scrambles the data in a way that distributes burst errors when the data is reordered at the receiver.

Figure 2:
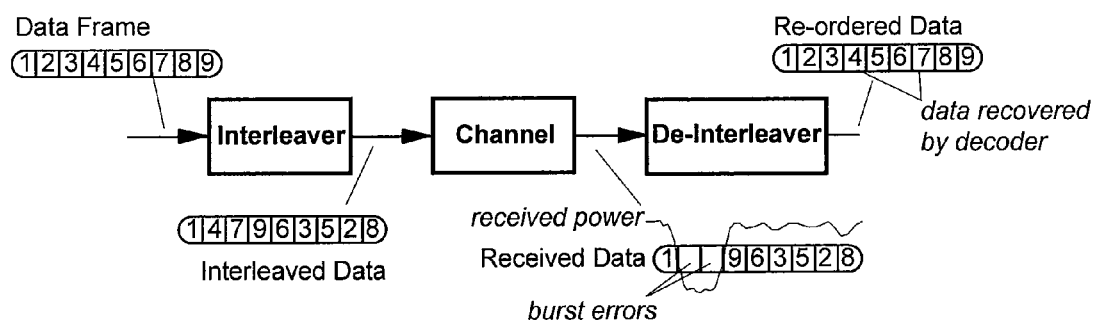
FIG. 2 shows a diagram that illustrates the operation of a channel interleaver/de-interleaver.

FIG. 2 shows a diagram that illustrates the operation of a channel interleaver/de-interleaver. Interleaving performs well for fast-fading channels characterized by large Doppler shifts. For example, as illustrated in FIG. 2, burst errors in the received data can be recovered when the data is reordered Slow-fading channels do not benefit from time diversity and therefore require another form of diversity to improve performance. Spatial diversity using dual receiving antennas is one such technique. This takes advantage of small-scale effects that cause the power of the received signal to vary over small distances. As such, the received power of two different antennas, separated by a fraction of a wavelength, differs.

Figure 3:
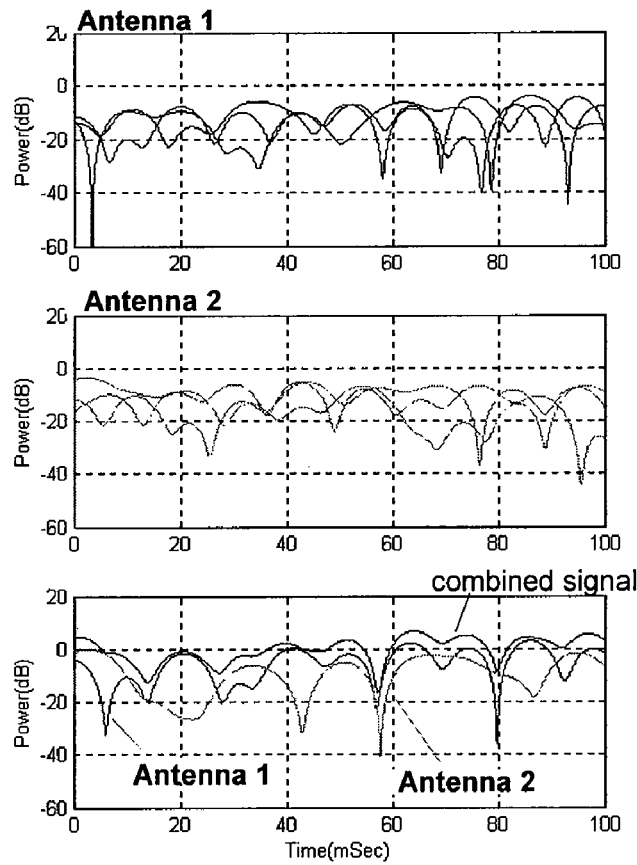
FIG. 3 shows graphs that illustrate how different independently fading signals are received at two antennas, and how those signals combine.

FIG. 3 shows graphs that illustrate how different independently fading signals are received at two antennas, and how those signals combine. This effectively reduces the probability that both antennas receive deeply faded signals simultaneously.

Figure 4:
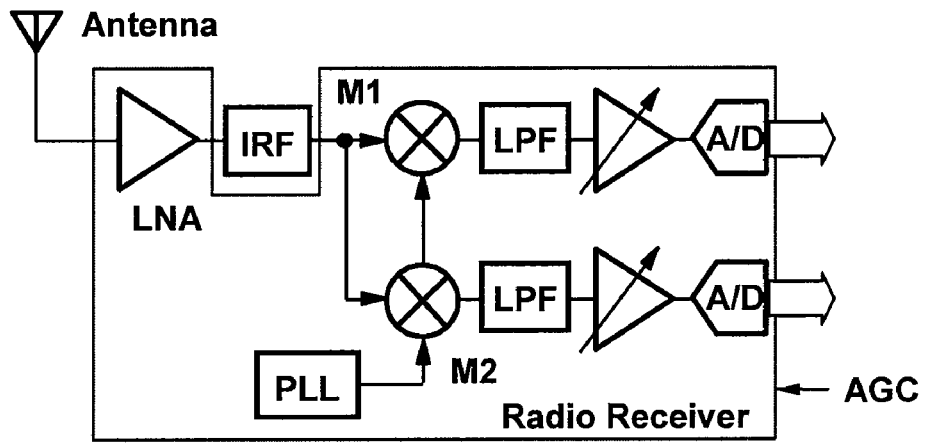
FIG. 4 shows one embodiment of a radio frequency receiver.

FIG. 4 shows one embodiment of a radio frequency (RF) receiver. The radio receiver comprises a low noise amplifier (LNA) to interface to the antenna, downconversion mixers (M1, M2) to translate the radio signal to baseband, and various analog circuits to filter, amplify, and convert the baseband signal to digital format. Two orthogonal channels (generated by in-phase and quadrature-phase local oscillator signals derived from a .PLL drive the downconversion mixers) preserve the phase of the modulated signal. An automatic gain control (AGC) signal provided by an AGC circuit (not shown) provides feedback, via a feedback loop, to the radio receiver's variable gain amplifiers (VGAs) to adjust the signal level applied at the A/D converters input. The AGC operates on the root-mean-square (RMS) value of the received signal.

Figure 5:
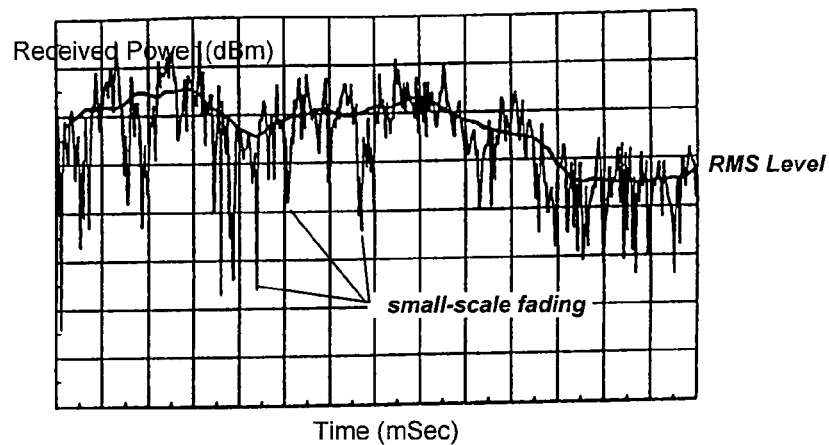
FIG. 5 shows a graph that illustrates the RMS level of a received signal subject to small-scale fading.

FIG. 5 shows a graph that illustrates the RMS level of a received signal that is subject to small-scale fading. For example, the receiver shown in FIG. 4 may receive the signal illustrated in FIG. 5. The received signal is described by a relative signal strength indicator (RSSI) and defined by:

$$RSSI_k = \sqrt{v_{1,k}^2 + v_{Q,k}^2}$$

where $v_{1,k}$ and $v_{Q,k}$ are the in-phase and quadrature-phase sample levels at time k quantized by the A/D converters. The feedback loop also includes simple low pass filters to ensure that the AGC ignores fast fading signals and acts on the average RMS level.

The sampled, integer-valued outputs from the A/D converters connect to the baseband receivers, which perform operations in the digital domain that depend on the particular signal format. For TDMA and FDMA systems, the filters comprise match filters. For direct-sequence code division multiple access (DS-CDMA) schemes, the matched filters are followed by a Rake receiver that performs despreading/descrambling and multipath combining.

As illustrated in FIG. 1, the dual diversity receiver comprises a second antenna and duplicates the complete signal-processing path from the received radio signals to the soft outputs from the matched filter or Rake receiver. After independent RF and baseband processing, the signal samples from the two antennas need further processing to take advantage of their diversity. This can be done either by a suitable combining algorithm or by a switching algorithm that selects the stronger signal.

Figure 6:
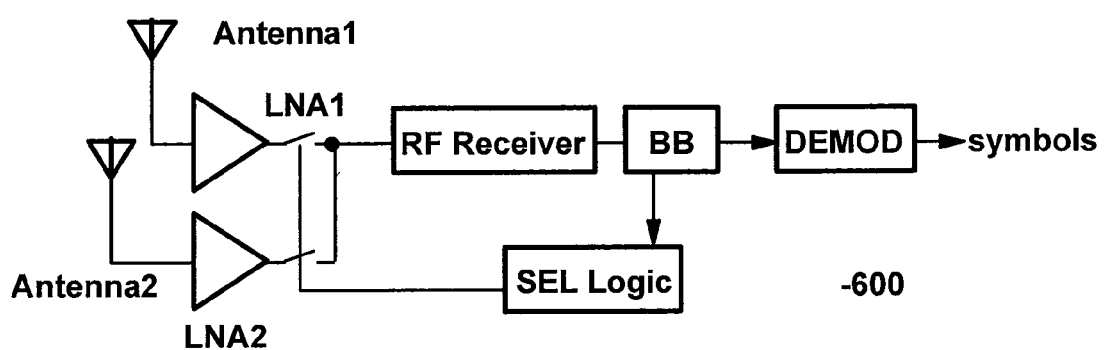
FIG. 6 shows a diagram of one embodiment of a dual diversity receiver that comprises a pair of switched-LNAs.

FIG. 6 shows a diagram of one embodiment of a dual diversity receiver 600 that comprises a pair of switched-LNAs (LNA1, LNA2) and thus greatly simplifies the RF and baseband complexity of the receiver. The receiver 600 further comprises a selection algorithm performed by selection logic (SEL Logic) that selects and periodically verifies the stronger received signal. For example, the selection logic operates to verify which of the two antennas is providing the stronger signal. The selection logic may be implemented in hardware, software or any combination thereof. For example, the selection logic may comprise hard logic, a processor, gate array or any other suitable hardware and/or software to implement the selection algorithm.

Figure 7:
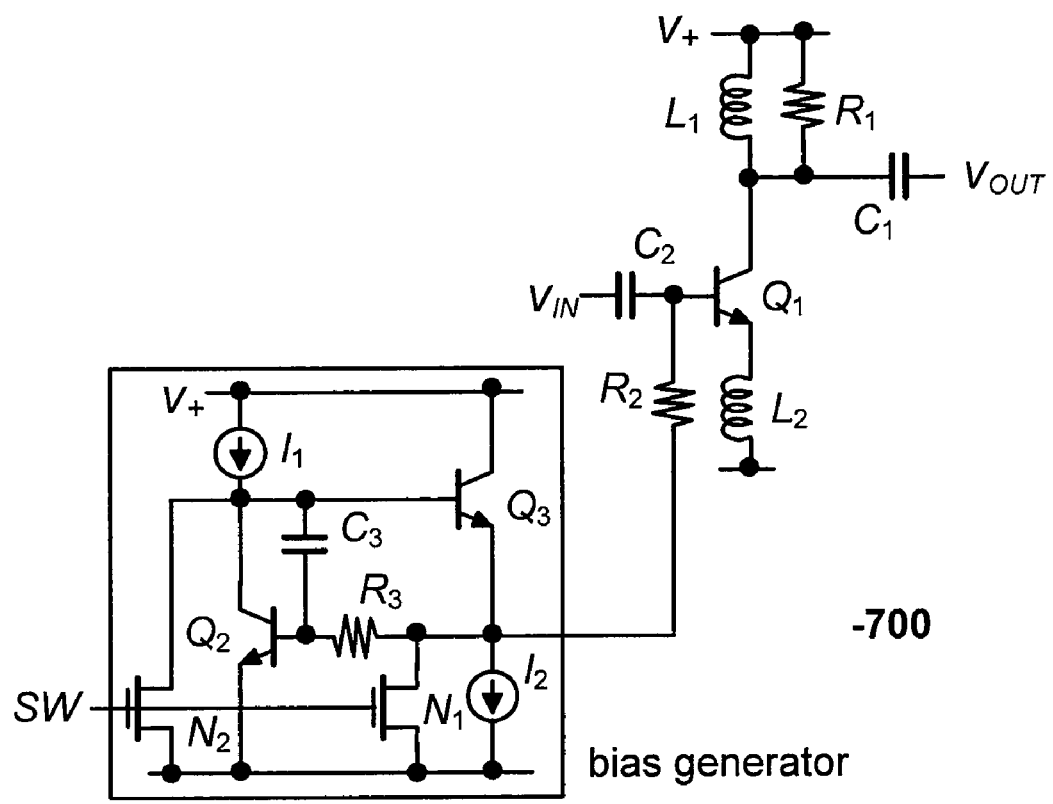
FIG. 7 shows a diagram of one embodiment of a switched LNA that comprises a bias generator.

FIG. 7 shows a diagram of one embodiment of a switched LNA 700 that comprises a bias generator. For example, the LNA 700 may be used as LNA1 and LNA2 in the receiver 600 shown in FIG. 6. The switched LNA consists of a common emitter amplifier ($Q_1$) with inductive degeneration ($L_2$) and a tuned output load ($L_1$, $C_1$, and $R_1$). The inductive degeneration provides two benefits—it introduces linear feedback and also increases the real part of the amplifier's input impedance, easing input matching. The bias generator sets the operating current of the LNA and transistor $Q_1$ equal to:

$$I_{C1} \square \frac{A_{E1}}{A_{E2}} I_{C2}$$

where $I_c$ and $A_E$ are the collector current and emitter area of transistors $Q_1$ and $Q_2$. Note that the collector current $I_{c2}$ approximately equals the reference current $I_1$ in the bias generator. MOS transistors $N_1$ and $N_2$ provide a simple and effective way to disable the LNA. Turning on these devices, shunts the reference current $I_1$ to ground and nulls the base-emitter voltage applied to transistor $Q_1$.

The dual diversity receiver (i.e., receiver 600) utilizes two switched LNAs, which share the same tuned output load. Only one LNA is active at any given time so that the quiescent current flowing through the load is relatively constant. This is easily accomplished by using complementary switching signals to drive the separate bias generators associated with each LNA.

Figure 8:
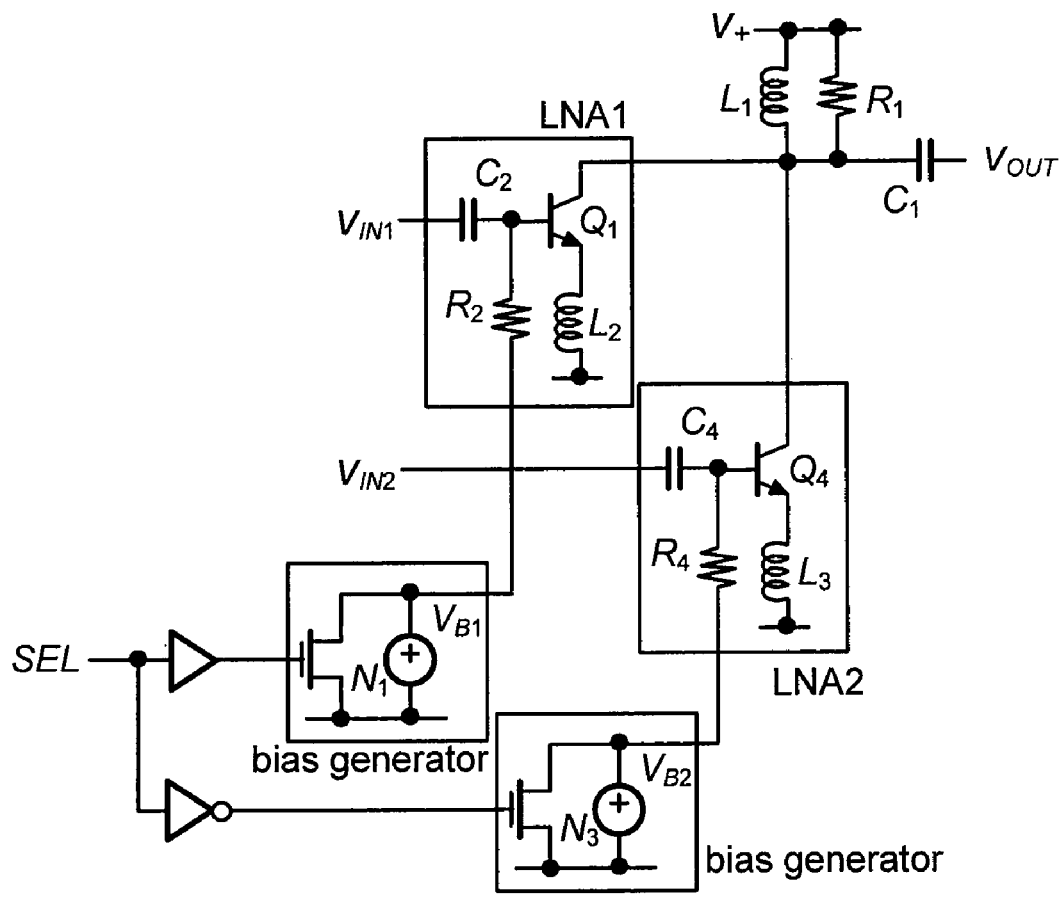
FIG. 8 shows a diagram of one embodiment of two switched LNAs and logic to provide complementary switching signals.

FIG. 8 shows a diagram of one embodiment of two switched LNAs and logic to provide complementary switching signals. During operation, the select signal (SEL) activates LNA1 when low and activates LNA2 when high. For example, the SEL signal may be generated by the SEL logic shown in FIG. 6. The response of the bias generator when activated is dampened to prevent overshoot of the LNA's operating current.

Figure 9:
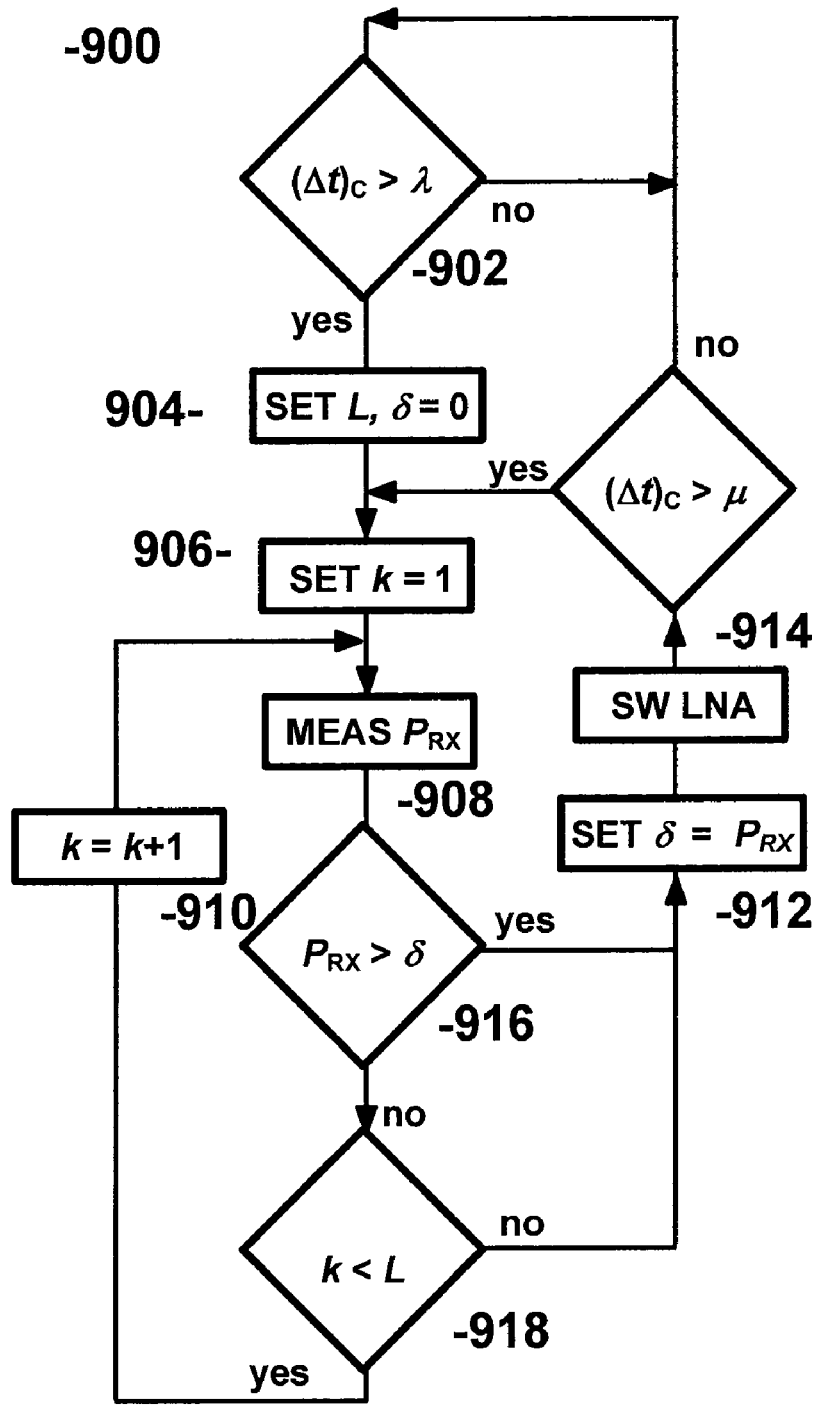
FIG. 9 shows one embodiment of a method for use with one embodiment of a dual diversity receiver to adjust a selection signal (SEL) to activate the LNA receiving the stronger signal.

FIG. 9 shows one embodiment of a method 900 for use with one embodiment of a dual diversity receiver (comprising switched LNAs) to control the selection signal (SEL) in a way that activates the LNA receiving an antenna signal having a selected signal characteristic. For example, in one embodiment, the selected signal characteristic is signal strength, so that the LNA receiving the stronger signal is selected. For example, in one embodiment, the method comprises an algorithm implemented by the SEL logic shown in FIG. 6. For example, the SEL logic generates a SEL signal to control the operation of the two LNAs.

The method starts (block 902) when the estimated coherence time $(\Delta t)_c$ (inverse of the Doppler spread) of the wireless channel exceeds the threshold $\lambda$. This indicates that the channel's response is changing slowly and the time diversity benefit associated with interleaving is waning.

At block 904, the coherence time is measured continuously and translated to a parameter L, which is equal to:

$$L = \left\lfloor \frac{(\Delta t)_c}{T_s} \right\rfloor$$

where $T_S$ is a switching slot time, equal to the time needed to activate the opposite LNA and measure its received power level, and the symbol $\lfloor x \rfloor$ is the integer part of x.

During operation, the method utilizes accurate estimates of the channel and the Doppler frequency. In one embodiment, a first-order infinite impulse response (IIR) digital filter is used to perform the channel estimate $(\square t)c$.

At block 906, in order to rapidly and reliably estimate the received signal power at start-up and after switching to a new active antenna, the parameter K is made variable. A reset signal initializes the value of K to 1, so that the first output of the IIR digital filter coincides with the first input. K is then incremented (1, 2, 3, . . . ) to provide a smoothed channel estimate with:

$$y_k = \frac{1}{K}(x_k - y_{k-1}) + y_{k-1} = \frac{1}{K}\sum_{i=1}^{k} x_i$$

During operation, the parameter K is incremented (at block 910) until the factor 1/K falls below a minimum value that depends on the Doppler frequency and corresponds to the steady-state response of the filter.

The power level received by the newly activated LNA is monitored over the switching slot, as shown at block 908. The dual diversity algorithm then identifies the stronger signal and stores the received power of the weaker signal as (block 912). If necessary, the LNAs are switched to activate the LNA associated with the stronger received signal (block 914). This LNA remains active until either of the following conditions at blocks 916 and 918 are satisfied:

$$P_{Rx} \leq \delta K \geq L$$

where $P_{RX}$ is the measured received level and k is used to count the number of switching slots that have passed since the weaker received signal was measured. When either of these conditions is satisfied, the opposite LNA is switched and a new power measurement is made. This is then compared with the previous power measurement.

It should be noted that the method 900 illustrates just one embodiment and that changes, additions, or rearrangements of the method steps may be made without deviating from the scope of the invention.

Figure 10:
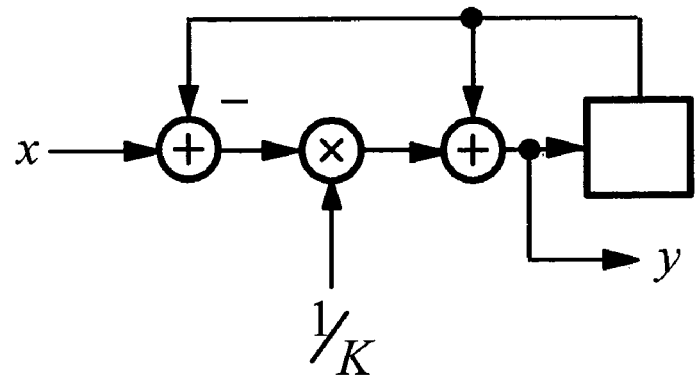
FIG. 10 shows a diagram of one embodiment of first-order IIR digital filter used to perform a channel estimate.

FIG. 10 shows a diagram of one embodiment of a first-order IIR digital filter 1000 used to perform the channel estimate. The input x to the digital filter 1000 is a noisy estimate of the channel amplitude and y is the improved, averaged estimate. The initial estimate x is dependent upon the communication system and is therefore found in different ways. For WCDMA systems, the pilot channel is analyzed, whereas for other systems (like GSM) a suitable preamble or mid-amble of known symbols is used. The IIR filter 1000 has a bandwidth that depends on a parameter K, which matches the speed at which the channel varies to improve the accuracy of the smoothed estimate y. The parameter that determines this speed is the channel coherence time, which is related to the Doppler frequency.

To simplify the fixed-point implementation of the channel estimation filter, the constant K is chosen to be a power of two, i.e.

$$K=2^n$$

so that the multiplication by 1/K simply corresponds to shifting the input value by n positions to the right. In this case, the exponent n can only assume integer values, which are chosen so that the sequence of K approximates the sequence of integers (1,2,3,4, ... ). The preferable sequence of n is therefore 0,1,2,2,2,3,3,3,3,3, ....

Figure 11:
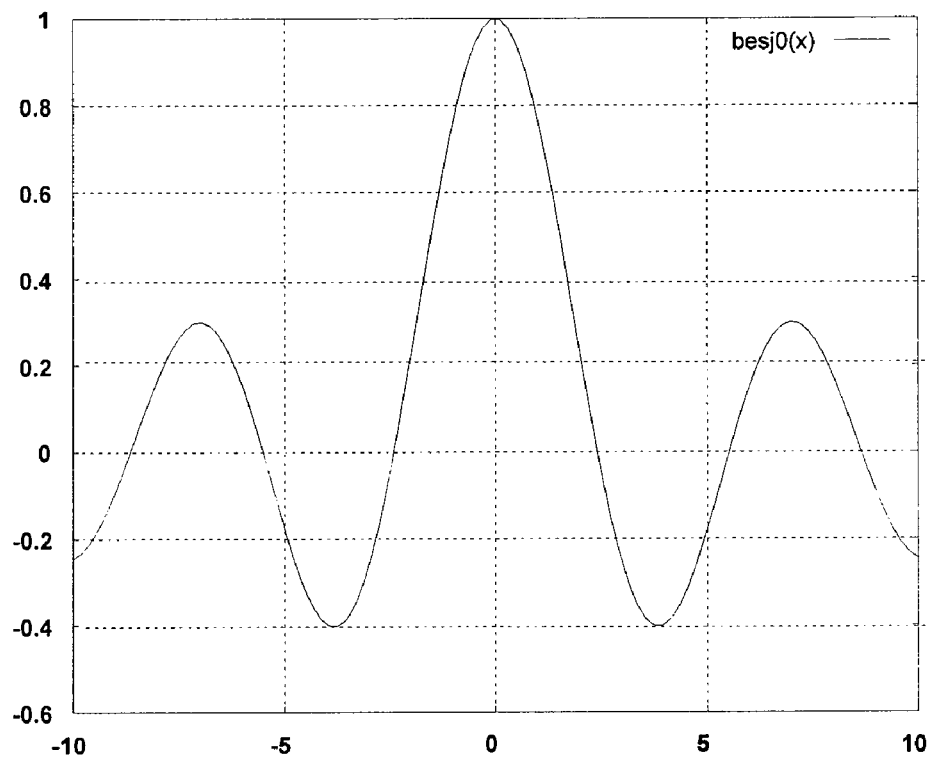
FIG. 11 shows a graph that illustrates an autocorrelation function of a typical Jake's spectrum fading process.

The estimate of the Doppler frequency $f_D$ is an important task in wireless receivers as it determines the bandwidth of the (digital) filter that performs channel estimation. In one or more embodiments, a simple, innovative algorithm is used to evaluate the Doppler frequency. It is based on the analytical expression of the autocorrelation function of the fading process expressed as:

$$R(t)=J_0(2\pi f_D t)$$

and depends on the Bessel function $J_0$ as plotted in FIG. 11. The fading process is typically simulated using Jake's model.

Figure 12:
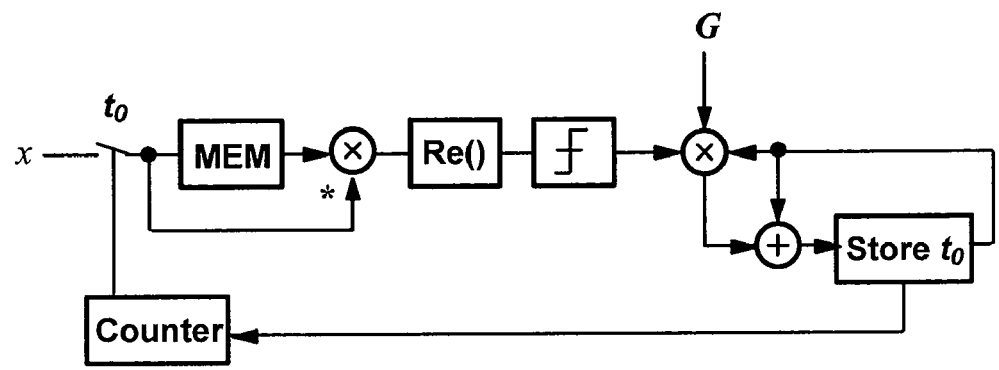
FIG. 12 shows a diagram of one embodiment of a digital feedback circuit for the estimation of a Doppler frequency.

The first zero of the autocorrelation function (corresponding to the argument of 2.4048) yields the following relationship between the minimum interval $t_0$ between two uncorrelated fading samples and the Doppler frequency:

$$f_D = \frac{2.4048}{2\pi t_o} = \frac{0.3827}{t_0}$$

and thus allows an estimate of the Doppler frequency through a digital feedback circuit that measures $t_0$, as shown in FIG. 12.

The initial complex estimates x of the channel are sampled with a period corresponding to the current stored value $t_0$. The sample is multiplied by the complex conjugate of the previously stored value, and the sign of the real part of the result is used to update the estimation $t_0$. The update step for the estimate is given by $Gt_0$, where the constant G is chosen to stabilize the loop and provide the desired accuracy. As a result, the step size depends upon $t_0$, and this advantageously increases the estimation speed when the Doppler frequency (and updating frequency) is very low. The initial values for $t_0$ should be small enough to ensure that the initial sampling of the fading process is frequent enough and to prevent the circuit from locking onto zeroes of the autocorrelation function other than the first one. Also, it is effective to limit the maximum value of $t_0$, and thus the minimum value of the Doppler frequency $f_D$, in order to improve the tracking capabilities of the circuit.

Figure 13:
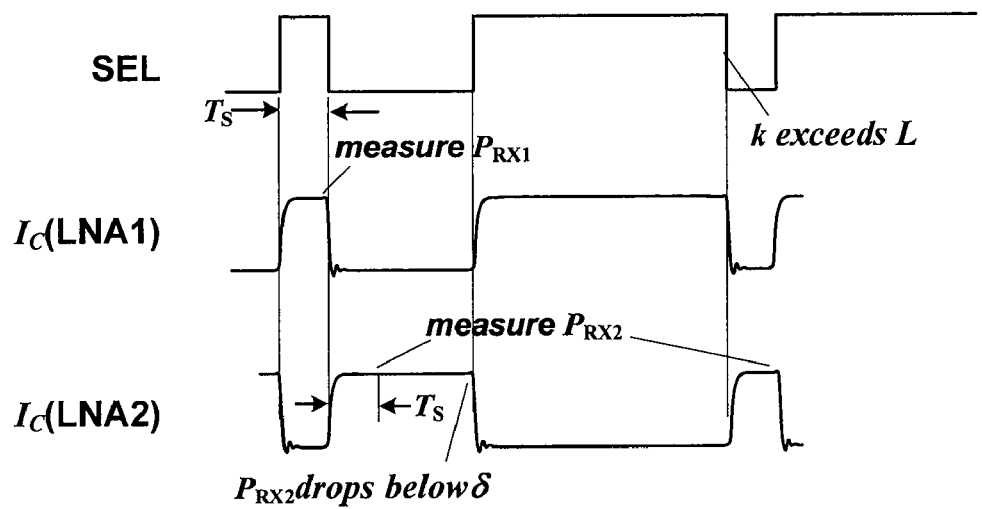
FIG. 13 shows a diagram that illustrates the switching slot timing and other timing points associated with the method of FIG. 9.

FIG. 13 shows a diagram illustrating the timing associated with the dual diversity receiver. The dual diversity algorithm continues to run as long as the coherence time exceeds a second threshold μ, set to a value less than λ, to introduce hysteresis. As shown in FIG. 13, the selection signal (SEL) controls the operation of the LNAs.

Figure 14:
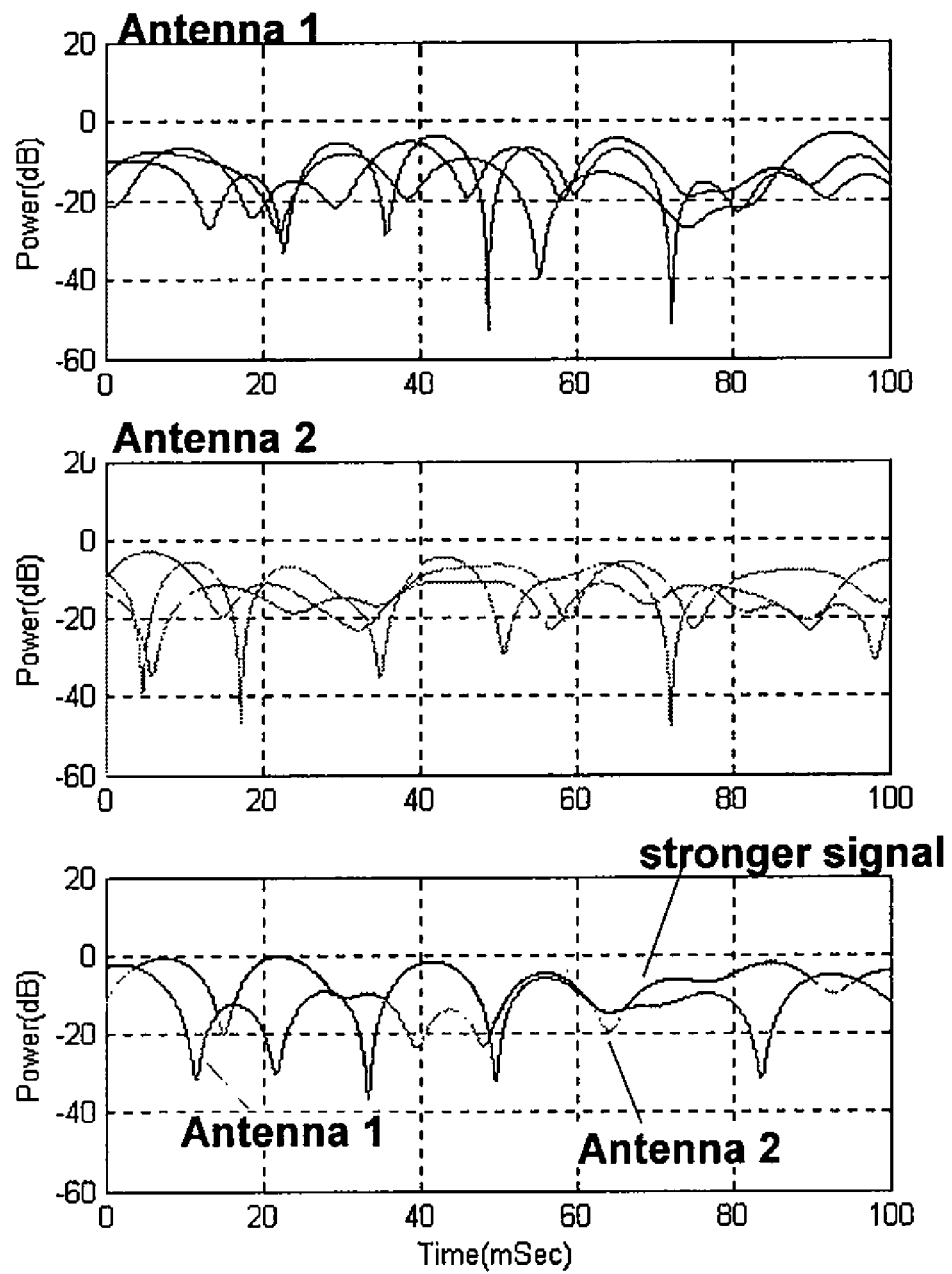
FIG. 14 shows graphs that illustrate the benefits of selecting the stronger received signal using one embodiment of a dual diversity receiver using switched LNAs.

FIG. 14 shows graphs that illustrate how in one or more of the embodiments, the dual diversity receiver increases the minimum power level and thereby improves the signal-to-noise ratio (SNR or equivalently $E_b/N_o$) of the received signal. This is accomplished this by selecting the stronger of two received signals and verifying this against two criteria.

The performance of the dual diversity receiver using switched LNAs and the associated selection algorithm was simulated for application in WCDMA communication systems. The communication channel was modeled as three Rayleigh-distributed fading components with equal power and propagation delays of 0, 3.75, and 76.92 μsec, respectively. The switching slot time was set to 1 msec. The mobile receiver was moving at speeds of 3, 25, and 50 km/hr.

Figure 15:
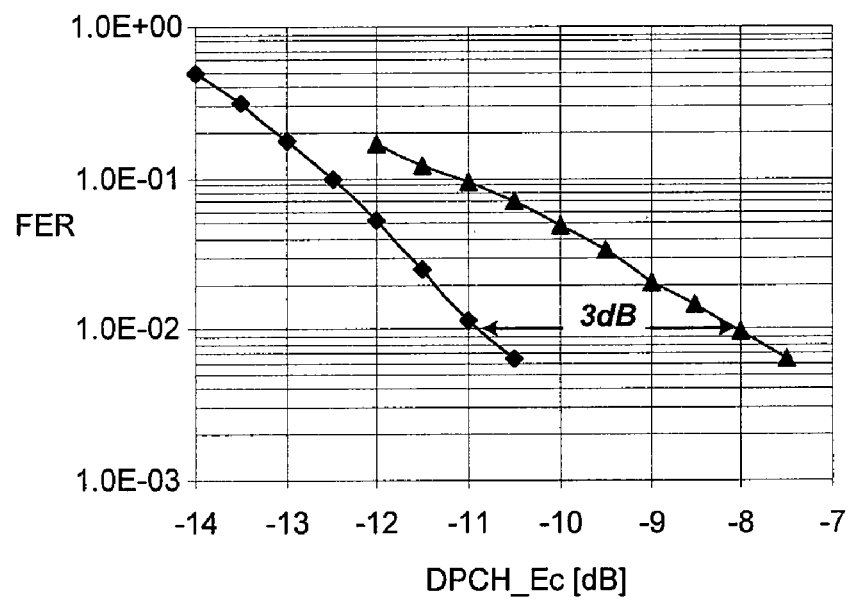
FIG. 15 shows a graph that illustrates the frame error rate versus received signal power for a single antenna receiver and one embodiment of a dual diversity receiver in a vehicle at a speed of 3 km/hr.
Figure 16:
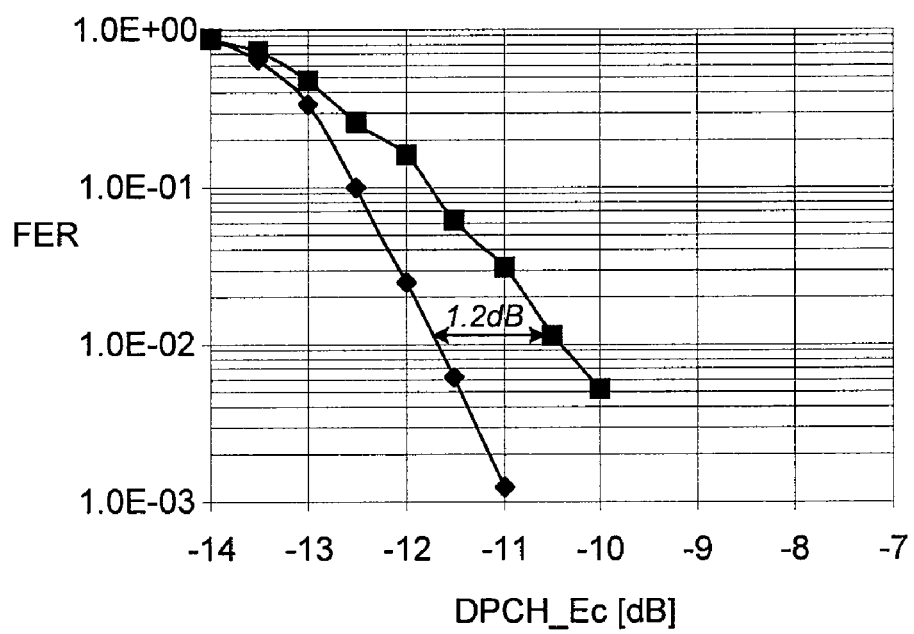
FIG. 16 shows a graph that illustrates the frame error rate versus received signal power for a single antenna receiver and one embodiment of a dual diversity receiver in a vehicle at a speed of 25 km/hr.
Figure 17:
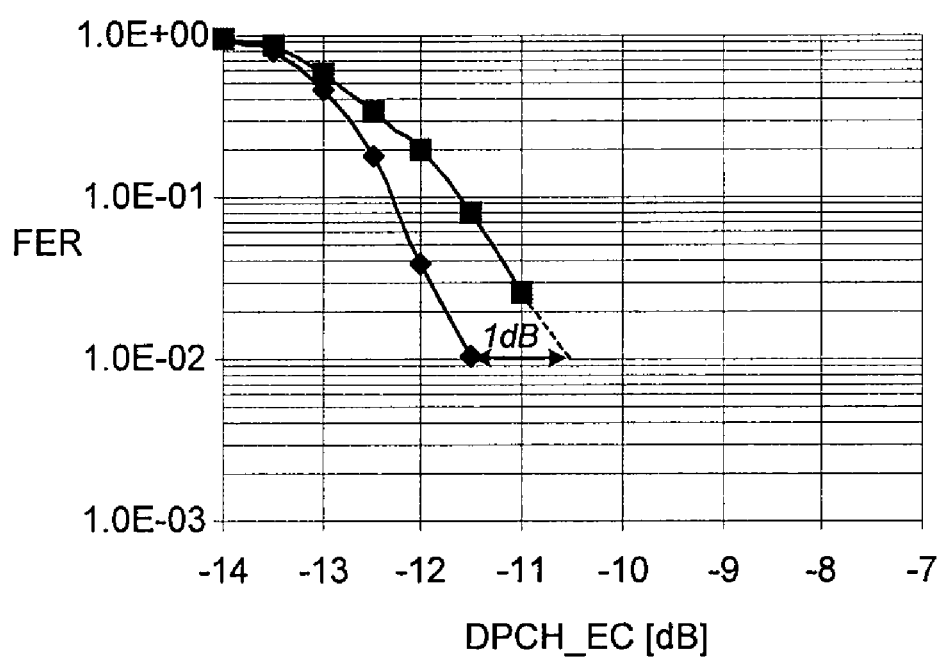
FIG. 17 shows a graph that illustrates the frame error rate versus received signal power for a single antenna receiver and one embodiment of a dual diversity receiver in a vehicle at a speed of 50 km/hr.

FIGS. 15, 16 and 17 compares the received signal power of a single antenna receiver and one embodiment of a dual diversity receiver as described herein. These performance curves illustrate the benefits of the switched antenna dual diversity receiver operating in a vehicle at vehicle speeds of 3, 25 and 50 km/hr. In the graphs, the received signal from the dual diversity receiver is always the curve on the left side. Note that 3 dB improvement was observed at the slowest speed and approximately 1 dB improvement was measured at the highest vehicle speed.

In one or more embodiments, a dual diversity receiver using switched LNAs and an innovative selection algorithm has been described. During operation, the receiver activates the LNA and antenna associated with the stronger received signal to take advantage of spatial diversity. The algorithm requires the estimate of the two antenna channels and of the Doppler frequency. Two innovative digital circuits to perform both estimates have been described. As a result, improved performance is realized with a very efficient radio architecture that requires only a second switched LNA, thereby providing power, cost, and area improvements as compared to conventional receivers. It is also possible to incorporate embodiments of the invention into receiver systems having more than two antennas. Based on the above disclosure, such incorporation could be implemented by one with knowledge of receiver systems.

Accordingly, while one or more embodiments of methods and/or apparatus for a dual diversity receiver system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A dual diversity receiver that includes first and second antennas to receive first and second radio signals provided in a wireless channel, wherein the first and second antennas produce first and second antenna signals that are representative of the received radio signals, the receiver comprising:
   a first LNA that receives the first antenna signal and produces a first amplified signal;
   a second LNA that receives the second antenna signal and produces a second amplified signal; and
   selection logic to monitor a signal characteristic of said first and said second amplified signals and a channel characteristic of the wireless channel, and select one of the first LNA and the second LNA so that its output is processed by the receiver; wherein
   said selection is based at least in part upon said signal characteristics and said channel characteristic, and wherein said signal characteristic is a signal strength measurement and said channel characteristic is a coherence time.

2. The receiver of claim 1, wherein the first and second LNAs further comprise first and second bias generator circuits that control the operation of their respective LNA based on a selection signal.

3. The receiver of claim 1, wherein said selection logic is configured to switch between said first and said second LNA when the signal strength of the provided signal is less than a threshold value or when the elapsed time receiving the current signal exceeds the coherence time of the wireless channel; wherein the threshold value is based the signal strength of the previously selected amplified signal.

4. The receiver of claim 1 wherein said selection logic comprises a switching apparatus integrated within said first and said second LNAs; wherein said switching apparatus is operative to switch said output from said first and said second LNAs.

5. A method for operating a dual diversity receiver that includes two antennas to receive a radio signal, wherein each antenna produces an antenna signal that is representative of the radio signal, the method comprising the steps of: inputting the antenna signal from each antenna to a corresponding LNA that produces an amplified signal;
   providing one of the amplified signals to the receiver;
   determining the coherence time of the wireless channel;
   determining the signal strength of the provided signal;
   selecting one of the amplified signals to be provided to the receiver, said selecting based at least in part on the signal strength and the coherence time; and
   repeating the steps of determining and selecting.

6. The method of claim 5 wherein said selecting comprises switching the provided amplified signal when the signal strength of the provided signal is less than a threshold value or when the elapsed time receiving the signal is greater than the coherence time of the wireless channel; wherein the threshold value is based on the signal strength of the previously provided amplified signal.

7. The method of claim 6, further comprising using a digital filter to measure said coherence time.

8. The method of claim 7 wherein said digital filter is an IIR filter.

9. A dual diversity receiver system for receiving signals in a wireless channel, comprising:
   a receiver circuit;
   a first antenna to receive a radio signal and produce a first antenna signal;
   a second antenna spatially separated from said first antenna to receive said radio signal and produce a second antenna signal;
   a first LNA to receive said first antenna signal and produce a first amplified signal;
   a second LNA to receive said second antenna signal and produce a second amplified signal; and
   selection logic to selectively provide one of the first amplified signal or the second amplified signal to the receiver circuit, said selection based at least in part upon a signal characteristic of the first amplified signal and the second amplified signal, and a channel characteristic of the wireless channel, wherein said signal characteristic is a signal strength measurement and said channel characteristic is a coherence time.

10. The receiver of claim 9 wherein said selection logic is configured to switch between said first and said second LNA when the signal strength of the Currently selected signal falls below a threshold value or the elapsed time receiving the current signal exceeds the coherence time of the wireless channel; wherein the threshold value is based on the signal strength of the previously selected amplified signal.

11. The receiver system of claim 9 wherein said selection logic comprises a switching apparatus integrated within said first and said second LNAs.

12. The receiver system of claim 10, further comprising using a digital filter to measure said coherence time.

13. The receiver of claim 12 wherein said digital filter is an IIR filter.

* * * * *